United States Patent [19]

Schleifstein

[11] Patent Number: 4,981,890

[45] Date of Patent: Jan. 1, 1991

[54] FLAME RETARDANT NYLON COMPOSITIONS

[75] Inventor: Robert A. Schleifstein, Baton Rouge, La.

[73] Assignee: Ethyl Corporation, Richmond, Va.

[21] Appl. No.: 355,560

[22] Filed: May 23, 1989

[51] Int. Cl.$^5$ ................................................. C08K 5/43
[52] U.S. Cl. ...................................... 524/169; 524/371
[58] Field of Search ................... 524/169, 371; 564/82

[56] References Cited

U.S. PATENT DOCUMENTS

| | | | |
|---|---|---|---|
| 3,760,003 | 9/1973 | Asadorian | 524/371 |
| 4,123,411 | 10/1978 | Coran | 524/169 |
| 4,218,357 | 8/1980 | Mark et al. | 524/169 |
| 4,254,015 | 3/1981 | Thomas et al. | 524/169 |
| 4,399,246 | 8/1983 | Hyde | 524/169 |
| 4,486,560 | 12/1984 | Thomas | 524/169 |
| 4,745,143 | 5/1988 | Mason et al. | 524/169 |

FOREIGN PATENT DOCUMENTS 51-46089  12/1976  Japan .

OTHER PUBLICATIONS

*Chemical Abstract* 66(9):37571a.
*Chemical Abstract* 66(3):10128z.
*Chemical Abstract* 64:8383f.
*Chemical Abstract* 58:5671e.
*Chemical Abstract* 58:3341c.

*Primary Examiner*—Veronica P. Hoke
*Attorney, Agent, or Firm*—John F. Sieberth; David E. LaRose

[57] ABSTRACT

Described are themoplastic condensation polymers containing a polyhaloaromatic aromatic flame retardant and an aromatic bis-sulfonamide having at least two aromatic rings and from 14 to 30 carbon atoms melt flow improver. These sulfonamides are of advantage in that they have relatively low volatilities at polymer processing temperatures.

7 Claims, No Drawings

FLAME RETARDANT NYLON COMPOSITIONS

This invention relates to thermoplastic polymer compositions which are flame retardant and have improved melt flow.

As is well known, good polymer melt flow is an important property, as polymer formulations having inadequate flow properties can give rise to burning and incomplete article formation during molding operations.

In accordance with this invention, polymer compositions are provided composed of a thermoplastic condensation polymer containing a polyhaloaromatic flame retardant and an aromatic bis-sulfonamide containing at least two aromatic rings (preferably two or three) and from 14 to 30 carbon atoms (preferably 18 to 24) in the molecule. In a preferred embodiment these aromatic bis-sulfonamides contain from 1 to 14 and most preferably from 6 to 14 halogen atoms (preferably chlorine or a mixture of chlorine and bromine, and most preferably bromine). The presence of such halogen atoms, especially when present as aromatic ring substituents, tends to enhance the thermal stability and flame retardant characteristics of the additive.

The sulfonamides used pursuant to this invention have relatively low volatilities at polymer processing temperatures and thus minimize the extent to which the additive is vaporized during polymer processing. This in turn reduces the extent to which ambient air quality is impaired during processing.

A wide variety of polyhaloaromatic flame retardants are suitable for use in the compositions of this invention. One preferred type is the halogenated polyphenylene ethers described in U.S. Pat. No. 3,760,003, all disclosure of which is incorporated herein reference. Another preferred type is the polyhalodiphenyl oxides, especially those containing from 12 to 20 carbon atoms in the molecule (i.e., two phenyl groups which may be alkyl-substituted) and from 4 to 10 halogen atoms (chlorine, a mixture of chlorine and bromine, and preferably bromine). See for example U.S. Pat. No. 3,624,024, all disclosure of which is incorporated herein. Also useful are the polyhalodiphenyl carbonates such as described in U.S. Pat. No. 3,624,024, especially those containing from 13 to 21 carbon atoms in the molecule (i.e., two phenyl groups which may be alkyl-substituted) and from 4 to 10 halogen atoms (chlorine, a mixture of chlorine and bromine, and preferably bromine). Still another preferred type is the alkylenebis(polyhalodiphenyls) having from 13 to about 24 carbon atoms and from 4 to 10 ring-substituted halogen atoms of the type described above. Still another type of polyaromatic flame retardant which may be used is the polyhaloaromatics containing from 6 to about 20 and from 4 to 10 ring-substituted halogen atoms of the type described above. Also useful are the alkylenebis(polyhalophthalimides) of the type described in U.S. Pat. Nos. 3,624,024, 3,873,567, 4,087,441 and 4,125,535, all disclosures of which are incorporated herein by reference. Use may also be made of 1:1 Diels-Alders adducts between a polyhalogenated anthracene with a multi-unsaturated aliphatic or cycloaliphatic hydrocarbon wherein the residual aromatic groups of the anthracene moiety contain 4 or more halogen atoms, the methods for the synthesis of which is described in U.S. Pat. Nos. 3,904,700 and 3,915,932, all disclosures of which are incorporated herein by reference. It will be noted that the foregoing conventional polyhaloaromatic flame retardants are devoid of the sulfonamide group.

Some illustrative polyhaloaromatic flame retardant compounds of the types described above are decabromodiphenyl oxide, octabromodiphenyl oxide, hexabromodiphenyl oxide, tetradecabromo-1,4-diphenoxybenzene, dodecabromo-1,4diphenoxybenzene, decabromo-1,4-diphenoxybenzene, tetradeca- bromo-1,3-diphenoxybenzene, dodecabromo-1,3-diphenoxybenzene, decabromo-1,3-diphenoxybenzene, decabromodiphenylmethane, decabromo-1,2-diphenylethane, octabromo-1,2-diphenylethane, decabromo-1,4-diphenylbutane, 2,2-bis(octabromophenyl)propane, ethylenebis(dibromophthalimide), ethylenebis(tetrabromophthalimide), hexabromobenzene, pentabromotoluene, hexabromodiphenyl, and corresponding chlorine-containing compounds, and the like.

Inasmuch as the polyhaloaromatic bis-sulfonamides used pursuant to this invention are themselves flame retardants, such polyhaloaromatic bis-sulfonamides can serve as the polyhaloaromatic flame retardant used in the compositions of this invention. That is to say, the polyhaloaromatic bis-sulfonamides can be used in combination with halogen-free aromatic bis-sulfonamides in formulating the finished polymer compositions of this invention.

Among the aromatic bis-sulfonamides utilized pursuant to this invention are those represented by the general formula

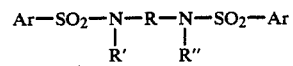

where Ar are the same or different aromatic or haloaromatic groups, R is a divalent hydrocarbon or halohydrocarbon group, and R' and R" are independently hydrogen atoms or hydrocarbon groups. Most preferably the two Ar groups are both the same as each other, and R' and R" are identical to each other.

One preferred type of aromatic bis-sulfonamides utilized pursuant to this invention are halogen-free compounds which may be represented by the general formula

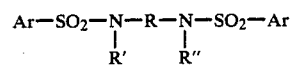

where each Ar group is a mononuclear aryl group having 6 to 10 carbon atoms, R is an alkylene group having from 1 to 8 carbon atoms, and R' and R" are identical to each other and are hydrogen or alkyl groups each having up to 12 carbon atoms, and preferably up to about 8 carbon atoms.

Another preferred type of aromatic bis-sulfonamides utilized pursuant to this invention are halogen-free compounds which may be represented by the general formula

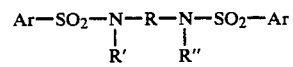

where each Ar group is a mononuclear aryl group having 6 to 10 carbon atoms, R is a cycloalkylene group having from 6 to 10 carbon atoms, and R' and R" are identical to each other and are hydrogen or alkyl groups each having up to 12 carbon atoms, and preferably up to about 8 carbon atoms.

Still another preferred type of aromatic bis-sulfonamides utilized pursuant to this invention are halogen-free compounds which may be represented by the general formula

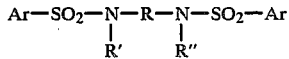

where each Ar group is a mononuclear aryl group having 6 to 10 carbon atoms, R is an arylene group having from 6 to 10 carbon atoms, and R' and R" are identical to each other and are hydrogen or alkyl groups each having up to 12 carbon atoms, and preferably up to about 8 carbon atoms.

One preferred type of halogen-containing aromatic bis-sulfonamides utilized pursuant to this invention are compounds which may be represented by the general formula

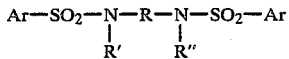

where each Ar group is a mononuclear aryl group having 6 to 10 carbon atoms and from 1 to 5 halogen atoms (preferably chlorine or bromine or both), and most preferably having 3 to 5 bromine atoms, R is an alkylene group having from 1 to 8 carbon atoms, and R' and R" are identical to each other and are hydrogen or alkyl groups each having up to 12 carbon atoms, and preferably up to about 8 carbon atoms.

Another preferred type of halogen-containing aromatic bis-sulfonamides utilized pursuant to this invention are compounds represented by the general formula

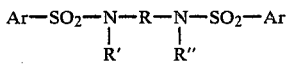

where each Ar group is a mononuclear aryl group having 6 to 10 carbon atoms and from 1 to 5 halogen atoms (preferably chlorine or bromine or both), and most preferably having 3 to 5 bromine atoms, R is a cycloalkylene group having from 6 to 10 carbon atoms, and R' and R" are identical to each other and are hydrogen or alkyl groups each having up to 12 carbon atoms, and preferably up to about 8 carbon atoms.

Still another preferred type of halogen-containing aromatic bis-sulfonamides utilized pursuant to this invention are compounds which may be represented by the general formula

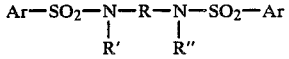

where each Ar group is a mononuclear aryl group having 6 to 10 carbon atoms and from 1 to 5 halogen atoms (preferably chlorine or bromine or both), and most preferably having 3 to 5 bromine atoms, R is an arylene group having from 6 to 10 carbon atoms, and R' and R" are identical to each other and are hydrogen or alkyl groups each having up to 12 carbon atoms, and preferably up to about 8 carbon atoms.

A few illustrative additives useful in the practice of this invention include
N,N'-p-cyclohexylenebis(benzenesulfonamide),
N,N'-o-phenylenebis(benzenesulfonamide),
N,N'-p-phenylenebis(benzenesulfonamide),
N,N'-hexamethylenebis(4-chlorobenzenesulfonamide),
N,N'-hexamethylenebis(4-bromobenzenesulfonamide),
N,N'-hexamethylenebis(2,5-dichlorobenzenesulfonamide),
N,N'-hexamethylenebis(2,4,5-trichlorobenzenesulfonamide),
N,N'-hexamethylenebis(2,4,5-tribromobenzenesulfonamide),
N,N'-ethylenebis(benzenesulfonamide),
N,N'-ethylenebis(2,5-dichlorobenzenesulfonamide),
N,N'-ethylenebis(4-bromobenzenesulfonamide),
N,N'-ethylenebis(2,4,5-trichlorobenzenesulfonamide),
N,N'-(1,2,3,4-tetrahydro-1,4-naphthalenediyl)bis(4-bromobenzene sulfonamide),
N,N'-1,2-ethanediylbis[2,5-dibromo-N-ethylbenzenesulfonamide],
N,N'-(9,10-dihydro-9,10-anthracenediyl)bis[N-methylbenzene-sulfonamide),
N,N'-(9,10-dihydro-9,10-anthracenediyl)bis[4-chloro-N-methyl-benzenesulfonamide),
N,N'-p-phenylenebis(2,4,5-tribromobenzenesulfonamide),
N,N'-p-phenylenebis(2,3,4,5-tetrabromobenzenesulfonamide),
N,N'-p-phenylenebis(pentabromobenzenesulfonamide), and
N,N'-(dibromo-p-phenylene)bis(tribromobenzenesulfonamide).

General methods which can be utilized for the preparation of the sulfonamides used pursuant to this invention are known and reported in the literature. The most common procedure is to react an aromatic sulfonyl halide with an aliphatic, cycloaliphatic or aromatic diamine. The halogen-containing aromatic bis-sulfonamides may be formed either by utilizing an aromatic sulfonyl halide having one or more halogen atoms on the ring or by subjecting a halogen-free aromatic bis-sulfonamide to chlorination or bromination under usual conditions for effecting substitutive ring halogenation of aromatic hydrocarbons. For further details concerning applicable synthesis procedures, see for example Holmsen, U.S. Pat. No. 3,281,233; Kirsanov, et al., Zh. Obshch. Khim., 1962, Vol. 32, 887–92; El-Hewehi, et al., J. Prakt. Chem. 1962, Vol. 16 No. 5–6, 297–336; El-Hewehi, et al., J. Prakt. Chem., 1966, Vol. 34 No. 5–6, 218–242, and Kuliev, Dokl. Akad. Nauk Az. SSR, 1976. Vol. 32(4), 25–29, all disclosures of which are incorporated herein by reference.

A wide variety of thermoplastic condensation polymers may be used in forming the compositions of this invention. Included are such thermoplastics as polyamides (all types of nylons such as nylon 3, nylon 4, nylon 6, nylon 6,6, nylon 6,10, nylon 6,12, nylon 7, nylon 8, nylon 11 nylon 12, nylon 12,12, etc.), polyesters (e.g., polyethylene terephthalate, polybutylene terephthalate, etc.), polycarbonates, polyphenylene oxides either singly or in blends with polystyrenes (both rubber-free and rubber-modified), and the like. Preferred polymers are the nylons, particularly nylon 6 (polycaprolactam), nylon 6,6 (the polyamide of hexamethylene diamine and adipic acid), nylon 12 (polylaurolactam), nylon 12,12 (the polyamide of laurolactam and dodecanedioic acid).

The concentration of the aromatic bis-sulfonamides used will of course dependent to some extent upon the identity and properties of the substrate thermoplastic polymer and of the particular additive system being employed therein, as well as the properties desired in the finished product. Generally speaking, however, the polymer will normally contain an amount of aromatic bis-sulfonamide falling in the range of from about 2 to about 20, and preferably from about 2 to about 10, parts by weight per hundred parts by weight of the total thermoplastic composition. However departures from these ranges are entirely permissible and are within the ambit of this invention. Those skilled in the art can readily determine optimal proportions by the simple expedient of performing a few tests with the materials selected for use.

In the practice of this invention there is employed an amount of the polyhaloaromatic flame retardant sufficient to impart flame retardancy or flame resistance to the resultant finished composition. For some applications, an amount sufficient to provide a V-1 rating by the UL Standard Test Procedure may be sufficient. For other more sensitive applications where a greater flame retardancy is required, the finished polymer composition should possess a V-0 rating by the UL Test Procedure. In this connection, the amount of the polyhaloaromatic flame retardant may be reduced when employing a halogen-containing aromatic bis-sulfonamide melt flow improver pursuant to this invention while still achieving the desired flame retardancy properties in the finished polymer. This reduction in concentration results from the fact that the halogen-containing aromatic bis-sulfonamides contribute significant flame retardancy to the finished composition and thus allow reductions in the proporptions of conventional flame retardant in the composition. Generally speaking, with unhalogenated aromatic bis-sulfonamides, the composition will contain an amount of the polyhaloaromatic flame retardant (which, as noted above, may be or include a polyhaloaromatic bis-sulfonamide), the total amount of such flame retardant should be sufficient to provide a bromine content in the finished polymer composition falling in the range of from about 4 to about 15 weight percent bromine or a chlorine content in the finished polymer composition falling in the range of from about 7 to about 21 weight percent chlorine. However, departures from these ranges are permissible and within the scope of this invention when the circumstances warrant or justify such departures. When using halogen-containing aromatic bis-sulfonamides as the the melt flow improver, the amount of the polyhaloaromatic flame retardant should be adjusted such that the total halogen content in the finished polymer (including the halogen provided by the polyhaloaromatic bis-sulfonamide melt flow improver) falls in the range of from about 4 to about 15 weight percent bromine or from about 7 to about 21 weight percent chlorine based on the total weight of the finished composition. Here again departures from these ranges may be found suitable under given circumstances and are thus within the ambit of this invention.

Methods for blending the additives into the substrate polymers are conventional and well known to those skilled in the art.

The advantages achievable by the practice of this invention is illustrated by the enhanced thermal stabilities of typical aromatic bis-sulfonamides as compared to typical aromatic mono-sulfonamides of the type normally used as plasticizers in nylon. In a series of experiments, thermogravimetric thermal decomposition onset values of such materials were as follows:

| | |
|---|---|
| N,N'-ethylenebis(benzenesulfonamide) | 357.1° C. |
| N,N'-hexamethylenebis(benzenesulfonamide) | 399.5° C. |
| N-ethylbenzenesulfonamide | 217.7° C. |
| N-propylbenzenesulfonamide | 224.1° C. |
| N-isopropylbenzenesulfonamide | 220.1° C. |
| N-cyclohexylbenzenesulfonamide | 220.9° C. |

The improvements achievable in melt flow characteristics were illustrated in experiments employing a commercially available nylon-6,6 (ZYTEL resin), containing tetradecabromodiphenoxybenzene (SAYTEX 120 flame retardant) and antimony oxide, in the weight proportions of 81% nylon, 14% tetradecabromodiphenoxybenzene and 5% antimony oxide. Melt index and heat deflection temperature (HDT) determinations on this polymer with and without a sulfonamide of this invention are shown in the following table.

| Sulfonamide | Amount | Melt Index, g per 10 min. 275° C./550 g ASTM D 1238 | HDT, °C. at 264 psi ASTM D 648 |
|---|---|---|---|
| None | None | 7.1 | 249 |
| N,N'-Ethylenebis-(benzenesulfonamide) | 3% | 8.5 | 247 |
| N,N'-p-Phenylenebis-(benzenesulfonamide) | 3% | 58.9 | 238 |
| N,N'-Hexamethylenebis-(benzenesulfonamide) | 3% | 22.1 | 240 |

It will be noted that the N,N'-ethylenebis(benzenesulfonamide) increased the melt index only slightly whereas two of the preferred additives of this invention (i.e., those containing at least 18 carbon atoms in the molecule) gave substantial improvements in melt flow with essentially no sacrifice in heat deflection temperature.

Other conventionally used additives such as reinforcing fillers, fibers, pigments, mold release agents, nucleating agents, flame retardants, flame retardant synergists (antimony oxide, zinc borate, ferric oxide etc.), heat stabilizers, U.V. stabilizers, antioxidants and the like may be included in the compositions of this invention. Such additives may be employed in their customary concentrations. The use of conventional halogenated flame retardants may be reduced or eliminated when employing an aromatic bis-sulfonamide of this invention containing from 6 to 14 bromine and/or chlorine atoms per molecule. A particularly preferred additive complement, especially for use in nylon containing a halogen-free aromatic bis-sulfonamide of this invention, is the combination of tetradecabromodiphenoxybenzene and antimony oxide wherein the polymer contains from about 10 to about 15 weight percent of the tetradecabromodiphenoxybenzene and from about 3 to about 6 weight percent of the antimony oxide.

This invention is susceptible to considerable variation in its practice within the spirit and scope of the appended claims.

What is claimed is:

1. Nylon containing a polyhaloaromatic flame retardant and an aromatic bis-sulfonamide having at least two aromatic rings and from 14 to 30 carbon atoms in the molecule in quantity sufficient to improve the melt flow properties of the polymer.

2. A composition of claim 1 wherein the aromatic bis-sulfonamide has two aromatic rings and from 18 to 24 carbon atoms in the molecule.

3. A composition of claim 2 wherein the sulfonamide is N,N'-p-phenylenebis(benzenesulfonamide).

4. A composition of claim 2 wherein the sulfonamide is N,N'-hexamethylenebis(benzenesulfonamide).

5. A composition of claim 2 wherein the nylon is nylon 6,6.

6. A composition of claim 2 wherein the nylon is nylon 6,6 and wherein the sulfonamide is N,N'-p-phenylenebis(benzene-sulfonamide).

7. A composition of claim 2 wherein the nylon is nylon 6,6 and wherein the sulfonamide is N,N'-hexamethylenebis(benzene-sulfonamide).

* * * * *